(12) United States Patent
Lindemann et al.

(10) Patent No.: US 7,047,098 B2
(45) Date of Patent: May 16, 2006

(54) PROCESS AND DEVICE FOR PRODUCING A SHAPED BODY BY SELECTIVE LASER MELTING

(75) Inventors: Markus Lindemann, Gerlingen (DE); Daniel Graf, Ditzingen (DE)

(73) Assignee: Trumpf Werkzeugmaschinen GmbH & Co., K.G., Ditzingen (DE)

( * ) Notice: Subject to any disclaimer, the term of this patent is extended or adjusted under 35 U.S.C. 154(b) by 233 days.

(21) Appl. No.: 10/080,936

(22) Filed: Feb. 21, 2002

(65) Prior Publication Data

US 2002/0152002 A1 Oct. 17, 2002

(30) Foreign Application Priority Data

Feb. 21, 2001 (EP) .................................. 01104121

(51) Int. Cl.
*G06F 19/00* (2006.01)

(52) U.S. Cl. .................. 700/119; 700/118; 700/120
(58) Field of Classification Search ........ 700/118–120, 700/191, 166; 219/121.8
See application file for complete search history.

(56) References Cited

U.S. PATENT DOCUMENTS

| | | | | |
|---|---|---|---|---|
| 4,724,299 A * | 2/1988 | Hammeke | ............... | 219/121.6 |
| 5,017,753 A * | 5/1991 | Deckard | ..................... | 264/497 |
| 5,260,009 A * | 11/1993 | Penn | ........................ | 264/401 |
| 5,460,758 A * | 10/1995 | Langer et al. | ............. | 264/401 |
| 5,582,876 A * | 12/1996 | Langer et al. | ............. | 427/492 |
| 5,817,206 A * | 10/1998 | McAlea et al. | .......... | 156/272.8 |
| 6,066,285 A * | 5/2000 | Kumar | ...................... | 264/439 |
| 6,122,564 A * | 9/2000 | Koch et al. | ................ | 700/123 |
| 6,372,178 B1 * | 4/2002 | Tseng | ........................ | 264/656 |
| 6,526,327 B1 * | 2/2003 | Kar et al. | ................... | 700/119 |
| 6,580,959 B1 * | 6/2003 | Mazumder | .................. | 700/121 |
| 2002/0065573 A1 * | 5/2002 | Mazumder et al. | ........ | 700/121 |

* cited by examiner

*Primary Examiner*—Leo Picard
*Assistant Examiner*—Alexander Kosowski (57) ABSTRACT

The invention relates to a process for producing a shaped body by selective laser melting, in which a shaped body is built up from pulverulent metallic material using CAD data of a model, in which a powder layer is applied using an applicator unit, and in which the applied powder layer is fixed to a layer below it using a focused laser beam, in which process the powder layer is levelled to a desired layer thickness as a result of a levelling device passing over the shaped body at least once, and during the levelling elevations that project above the desired layer height of the applied powder, of the layer which was last melted by the laser beam are uncovered by the levelling device.

22 Claims, 5 Drawing Sheets

PROCESS AND DEVICE FOR PRODUCING A SHAPED BODY BY SELECTIVE LASER MELTING

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to a process and a device for producing a shaped body by selective laser melting in which the shaped body is built up from pulverulent metallic material.

TECHNICAL FIELD

Figure 1:
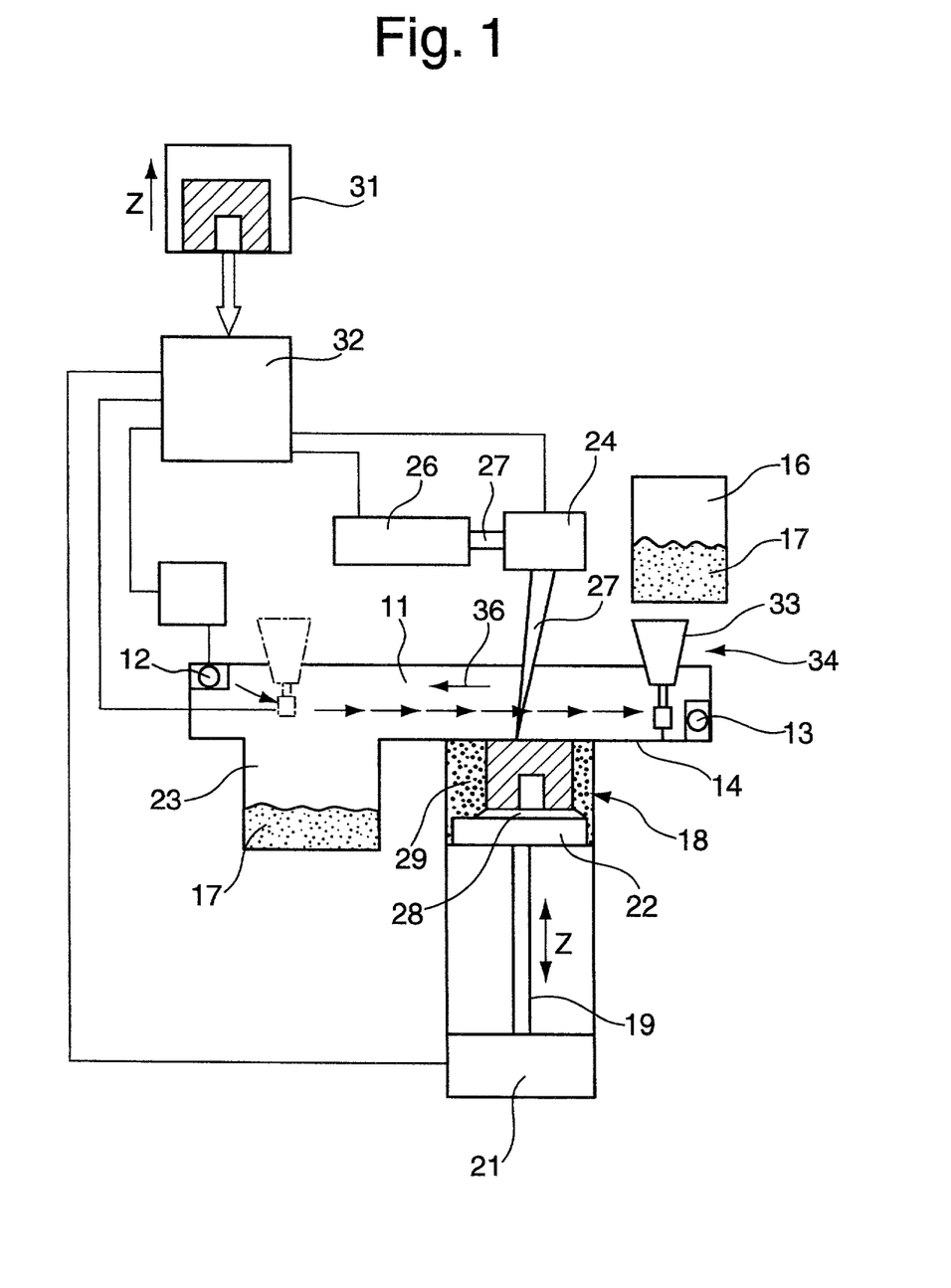
FIG. 1 diagrammatically depicts a device for producing a shaped body using the process according to the invention.

The present invention relates to a technique that is known by the name of rapid prototyping. These rapid prototyping processes are preferably used in product development, in order to shorten the product development time and to increase the product quality. This is made possible by producing prototypes direct from a three-dimensional CAD model. A process of this type is known from German Patent Document DE 196 49 865 C1. In this known process of selective laser melting, the components can be produced from commercially available steels or metals. For this purpose, the material is applied in powder form, in each case as a thin layer, to a building platform. The powder layer is locally melted using a laser beam to match the desired component geometry. The energy of the laser beam is selected in such a way that the metallic material powder is completely melted over its entire layer thickness at the point of incidence of the laser beam. In this process, the laser beam is guided over the predetermined area of the respective material powder layer in a plurality of tracks, in such a manner that each successive track of the laser beam partially overlaps the preceding track. At the same time, a shielding gas atmosphere is maintained above the zone of interaction between the laser beam and the metallic material powder, in order to avoid defects, which may be caused, for example, by oxidation. The steel components produced using this process satisfy the stipulated materials specifications in terms of their density and strength. A device for carrying out the process of selective laser melting is shown in FIG. 1 of DE 196 49 865.

The metallic material powder is distributed over the building platform or the building space by means of a levelling device, for example through linear movement of a slide over the reservoir of the material powder and the building space. After each layer has been processed by the laser beam, the slide distributes fresh powder over the component, which has been lowered by an amount corresponding to the layer thickness that is to be applied next. However, the layer which has been processed by the laser beam is not completely smooth. It is uneven and has projecting sections, which are in some cases greater than the layer thickness to be applied. At these points, the underside of the slide grinds over the layer that was last processed by the laser beam during application of the new layer of powder. Its passive action means that the slide becomes increasingly damaged and is subject to wear, so that as the operating time increases the desired layer thickness is no longer applied in planar form, or even increases.

If a prototype is of a very fine or delicate structure, for example is built up in column form with very thin wall thicknesses, the problem also arises that the shaped body that is built up may be damaged by the linear movement of the slide.

To improve this process, German Patent Document DE 198 53 978 C1 proposes a device in which a grinding device, in the form of a roller, is secured in front of the levelling device and is able to smooth the surface of each layer which has been processed by the laser beam before it is coated with a new layer of powder.

This grinding device is set at the same height as the levelling device, so that the unevenness or projecting sections which project above the thickness of powder layer to be applied are smoothed by the grinding device. As a result, contact and wear between the levelling device and the component can be avoided.

However, this device also has the drawback that, particularly when very fine, delicate structures are being built up, the action of the grinding device on the projecting sections and/or the feed rate cause the geometries built up to be damaged or destroyed. Particularly in the starting phase, during the first action of the grinding device, the projecting sections of the shaped body may be damaged even in the case of relatively large-area structures.

SUMMARY OF THE INVENTION

The invention is therefore based on the object of providing a process and a device for producing a shaped body by selective laser melting which avoids wear to the levelling device, is inexpensive to design and execute, and makes it possible to build up layers of constant thickness, in particular even in the case of delicate structures.

According to the invention, this object is achieved by a process for producing a shaped body by selective laser melting, in which a shaped body is built up from pulverulent metallic material using CAD data of a model, comprising the following steps: applying powder layer using an applicator unit; fixing the applied powder layer to a layer below it using a focused laser beam; applying the powder layer selectively by the applicator unit to regions of a surface of the shaped body that lie below or adjoin a plane that is defined by a predetermined layer thickness for a next powder layer that is to be processed; and a device for producing a shaped body by selective laser melting, for carrying out the process according to the invention, comprising: a process chamber, a build-up chamber for the shaped body; an applicator unit that, after the shaped body has been positioned, applies a layer of powder to a desired layer thickness, when positioned above the shaped body or passed over the shaped body at least once, wherein the applicator unit has selecting means for the selective application of the powder layer.

The process according to the invention makes it possible to apply a layer of powder at least to the areas of the surface of the shaped body which lie below or adjoin a plane which is defined by the predetermined layer thickness for the next powder layer to be processed, irrespective of projecting sections or unevenness, which is/are larger than the thickness of the powder layer to be applied, on a layer of the shaped body which was melted last. Amazingly, it was found that it is not necessary to abrade the projecting sections or unevenness projecting above the powder layer thickness to be applied.

This process ensures a more uniform build-up of the layer. The projecting sections or unevenness can be compensated for or integrated when the at least one further layer is built up, since there is no material powder applied to these projecting sections or unevenness.

When the laser beam is guided in a plurality of tracks over a predetermined area, not only is the applied layer thickness of the material powder completely melted, but also the projecting sections or unevenness projecting above the layer of material is/are at least superficially melted in the predetermined areas, thus allowing additional levelling of the projecting sections in order to form a more even new layer level. As a result, the projecting sections or unevenness is/are integrated with the melted layer.

This process according to the invention also makes it possible to eliminate one process step, which according to German Patent Document DE 198 53 978 comprises grinding away projecting sections using a grinding device. Furthermore, there is no mechanical action on the shaped body, with the result that it is possible to build up even delicate structures.

The process according to the invention for the selective application of a powder layer to a desired layer thickness, which is then welded on by means of a laser beam and is fixed to the layer below, can be effected by two principles.

A first principle is for the powder application to take place only at those points or on that or those areas that lie below and/or adjacent to a plane that is formed by the desired layer thickness. Consequently, the projecting sections or large areas which lie above the desired layer thickness for the powder application can be missed out. In this way, further growth of the unevenness or projecting sections can be prevented during the melting of the powder layer.

The second principle is for a powder layer which comprises at least the desired layer thickness for the material-powder layer which is to be melted by the laser beam to be applied, and the proportion of the powder layer which lies above this level to be removed by being pulled off, cleared away, blown off, sucked off or in some other way. In this way, once again selectively only those areas of the surface of the shaped body which lie below and/or adjacent to a plane which is formed by the predetermined layer thickness for the next powder layer to be processed are provided with a layer of powder.

According to an advantageous configuration of the process, it is provided that those areas which lie below and/or adjacent to the plane of the predetermined layer thickness for the next power layer to be processed are recorded by means of a device, and that the material powder is applied in finely metered form in those areas, and that, preferably, the applicator unit is positioned above the surface of or passes over the shaped body one or more times. In this way, controlled growth of the powder layer beneath the plane of the predetermined layer thickness for the next powder layer to be processed can be achieved. The areas to be coated are scanned or sensed by a probe or sensor. The recorded values are in the first case recorded by a computer program, in order for the quantity of powder then to be provided in a defined amount at these locations. This can be effected, for example, by one-off positioning of the applicator unit over the surface of the shaped body. For this purpose, it is possible, for example, to provide a die with a multiplicity of powder openings, which applies a predetermined quantity of the material powder in the recorded areas. The predetermined quantity may be effected even up to the individual application of powder grains. Alternatively, it is possible for the applicator unit to pass over one or more times in order to apply the material layer.

The levelling of the layer of the applied material powder and the uncovering of the projecting sections likewise allow selective application, in particular by pulling off powder layers which lie above the plane defined by the desired layer thickness of the material-powder layer which is subsequently to be processed. At the same time, the projecting sections or unevenness above the plane can be uncovered, and the valleys which are formed between the projecting sections or unevenness can be completely filled with the material powder up to the layer thickness which is to be applied, so that uniform growth of layers, in particular even in the case of delicate structures, can be achieved.

According to an advantageous configuration of the process, there is provision for the levelling device to pass over the shaped body at least twice, preferably three times, so that complete levelling of the valleys formed between the unevenness or projecting sections is ensured. The levelling device passing over at least twice ensures that material powder is supplied to the valleys close to the projecting sections from two opposite directions of movement. The levelling device also levels the lateral areas of the projecting sections, so that complete and uniform levelling of the material powder on the layer below it takes place. As a result, after the material powder has been melted, the laser beam, which is guided over the predetermined area in a plurality of tracks, is able to improve the planarity of the newly formed surface over the predetermined area.

To carry out the process, the invention provides a device that allows means for selectively applying material powder to defined areas of a surface of a shaped body. These means may be integrated or provided on the applicator unit. By way of example, the applicator unit may have at least one row of openings in nozzle form, it being possible for each individual nozzle or opening to be controlled for the purpose of selective application. It is also possible to provide a plurality of rows of openings, which, at least in some cases, are also arranged offset with respect to one another, in order to allow selective application of the material powder at any desired point on the surface of the shaped body, depending on the surface structure. A further means for selective application may consist in scanning elements being provided during passage over the surface which is to be provided with material powder, which scanning elements allow at least a section of the opening to be automatically closed when passing over projecting sections or unevenness lying above the layer thickness of the material powder which is to be applied. The applicator unit for this selective process may have a type of screen structure, which, through suitable actuation, opens or closes different openings in the screen. Furthermore, it is possible to provide a blowing device, a suction device, a clearing device in roller form or an electrostatic field or the like, in order, for example, to clear off, remove, pull off or suck off the material powder at the point(s) lying above the plane of the predetermined layer thickness for the subsequent processing of the material-powder layer which is to be applied.

To carry out the process, the invention provides a device which comprises a levelling device with individual elements which pulls off the powder layer down to the set desired layer thickness after the application and uncovers the projecting sections of the powder layer which project above the layer thickness to be applied. This has the advantage that the projecting sections do not grow further and are at least partly integrated during the melting of the material-powder layer.

When using stripper elements, as is known from the prior art, as these elements pass over the shaped body either the shaped body may be damaged or the layer thickness may become greater than the set desired layer thickness, in order that the projecting sections can be passed over without danger. Consequently, complete melting of the layer of the material powder applied is not possible. If the flexible stripper element is set to the height of the desired layer thickness and comes into contact with projecting sections, lateral accumulations of the powder layer are formed as it overcomes the projecting section. Immediately after the projecting section has been overcome, a backlash on the part of the stripper causes an indentation to remain in the layer. This leads to an irregular layer thickness, with the result that the unevenness or projecting sections are increased. This very effect is eliminated by the inventive configuration of the levelling device.

The levelling device advantageously has at least one row of individual elements that can be deflected when the device passes over projecting sections. This enables the projecting sections or unevenness to pass between the individual elements as the device passes over the shaped body, resulting in uniform levelling. At the same time, there is no wear with respect to a stripper element which is formed rigidly or flexibly with a stripper edge, which is continuous over the width of the building space, for levelling the material powder. Furthermore, this configuration has the advantage that only one or more individual elements are deflected, and the individual element(s) spring back after any deflection virtually without causing any adverse effect, since, in relative terms, the individual elements are of very thin or narrow design. Furthermore, the individual elements have an extremely low resistance, so that even damage to delicate structures is eliminated.

To level out to a constant layer thickness of the applied material powder, it is advantageously provided for the free ends of the individual elements to lie in a common plane, with the result that an imaginary continuous edge is formed, allowing the applied layer of material powder to be pulled off uniformly.

The levelling device is advantageously designed as a brush that has a plurality of bristles in one row and at least two rows of bristles as individual elements. In this way, it is possible to achieve a relatively tight curtain by means of the bristles, enabling a sufficient quantity of material powder to be provided in front of the levelling device, so that this powder can be guided away by the linear movement over the shaped body, in order for a constant layer thickness to be applied. Furthermore, the configuration of at least two rows of bristles has the advantage that a backlash from a bristle when it is deflected at a projecting section is damped and greatly weakened by the immediately adjacent bristle, so that unevenness in the material-powder layer caused by the backlash is avoided.

As an alternative advantageous embodiment of the levelling device, a lip having at least one row of small plates is provided. These small plates are preferably designed in strip form and can be deflected individually. Depending on the material used it is possible, for example in the case of a material with a high spring rate, to form a longer plate than when using a material with a low spring rate. The small plates, are, for example, cut out of a thin sheet-metal layer, preferably by laser cutting, with the result that the edges of the small plates which immediately adjoin one another are formed without burrs, in order that they can independently execute a deflecting movement.

The small plates may advantageously have a coating or further layers which have a damping action on deflected plates.

A further alternative embodiment of the levelling device is provided by an articulated arrangement of the individual elements. This allows the individual element to be deflected at a suspension point, with the result that a further degree of freedom is provided in addition to the bending of the individual element. It is advantageous for a damping element to be provided on one or both sides close to the deflection point of the individual elements, in order for the individual elements to be moved quickly, with damping, back into the undeflected state after they have been deflected by the projecting sections or unevenness.

Further configurations and refinements of the process and of the device are given according to the invention.

BRIEF DESCRIPTION OF THE DRAWINGS

The process according to the invention, as well as inventive embodiments of the device for carrying out the process, are described in more detail in the description below. In the drawing.

DETAILED DESCRIPTION OF THE INVENTION

FIG. 1 shows a device for selective laser melting, as described, for example, in German Patent Document DE 198 53 978 C1. The device comprises a process chamber 11 with a shielding-gas inlet 12, which is arranged in the region of the upper side edge of the process chamber 11, and a shielding-gas outlet 13 at the opposite edge, which is arranged in the region of a base surface 14 of the process chamber 11.

Above the base surface 14, there is a reservoir 16 that is filled with metallic material powder 17. The powder used may, for example, be steel, titanium or aluminium. A build-up chamber 18, in which there is a lifting table 22 that is driven by the drive 21 via a lifting piston 19, is provided beneath the base surface 14 in the process chamber 11. A collection vessel 23 for the metallic material powder 17 is provided next to the build-up chamber 18. A scanning device 24, which directs a laser beam 27 generated by a laser 26 onto the lifting table 22 with a building platform 28, is provided above the process chamber 11, in the region of the build-up chamber 18.

To produce a shaped body 29, for example the prototype of a component, first of all the component co-ordinates are entered into the central processing unit 32 via an input unit 31. After the data have been suitably processed, the lifting table 22 in the build-up chamber 18 is moved into a first, upper position, in which the bearing surface lies below the level of the base surface 14 by an amount which corresponds to a powder-layer thickness which is to be applied. A predetermined amount of fine-grained material powder 17 comprising metal is introduced from the reservoir 16 into a receiving vessel 33 of an applicator unit 34. To apply the material powder 17, the applicator unit 34 is moved over and beyond the shaped body that is to be built up, all the way to the collection vessel 23, at least once, over the base surface 14, in the direction indicated by arrow 36. In this limit position, the material powder 17 that is not required is discharged to the collection vessel 23. It is also possible for the shaped body 29 to be passed over a number of times, the applicator unit 34 only being positioned above the collection vessel 23 at the end of the displacement.

After this preparatory measure has been concluded, the laser 26 and the scanning device 24 are actuated, in order for the laser beam 27 to be directed onto the metallic material powder 17 situated above the building platform and in order to melt the powder which corresponds to the bottom layer of the shaped body 29 in accordance with the given co-ordinates. After the bottom layer of the shaped body 29 has been formed, the lifting table 22 is moved a defined distance downwards, so that the top side of the first layer lies slightly below the plane of the base surface 14 of the process chamber 11. Then, the applicator unit 34 is actuated again, in order for a defined layer of powder to be applied to the shaped body 16. Then, the laser beam 27 is once again moved over the powder track by track according to the component co-ordinates, in order to melt this powder. This movement in tracks for the melting of the powder layer is described in more detail in DE 196 49 865 C1.

Figure 2:
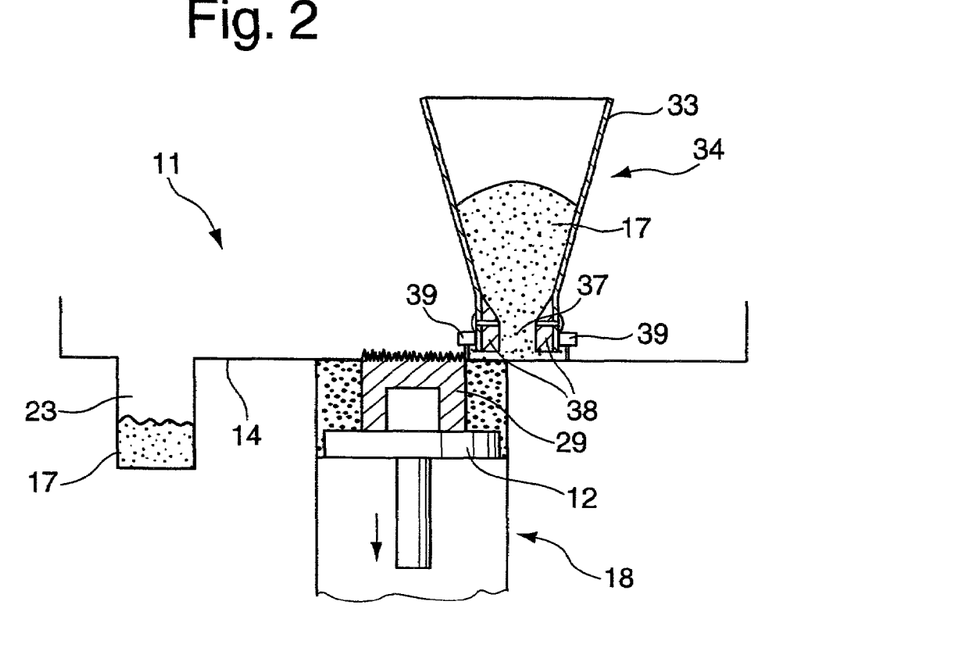
FIG. 2 shows an enlarged diagrammatic illustration of the levelling device for carrying out the process, FIGS. 3a, b and c show a diagrammatic view of a linear movement of the levelling device in chronologically successive steps, FIGS. 4a and b show a diagrammatic side view and sectional illustration of an alternative embodiment of a levelling device, FIGS. 5a and b show a diagrammatic front and side view of a further alternative configuration of a levelling device.

FIG. 2 shows an enlarged excerpt of the process chamber 11 and an enlarged illustration of the applicator unit 34. The material powder 17 is provided in the receiving vessel 33. At the lower end of the receiving vessel 33, the material powder 17 emerges via an opening 37 during the reciprocating movement. The opening 37 is delimited by strips 38, it preferably being possible to adjust the opening width by means of one or both strips 38, in order to determine the quantity of material powder 17 which escapes. Close to the opening 37, in front of and behind the opening 37, the applicator unit 34 has a levelling device 39, which levels the material powder 17 to the predetermined desired layer thickness. Alternatively, it is also possible for a levelling device 39 to be provided on only one of the two sides of the opening 37 or to lead or trail the opening 37. The operation of the levelling device 39 is explained in more detail below with reference to FIGS. 3a to c.

The levelling device 39 is set to the level of the base surface 14, so that the application of powder takes place in the build-up chamber 18. As an alternative, it is possible for the levelling device 39 to be adjusted to a height above the base surface 14, corresponding to the desired layer thickness to be applied. In this case, the surface of the shaped body 29 to which the layer of material powder is applied lies at the level of the base surface 14.

Figure 3A:
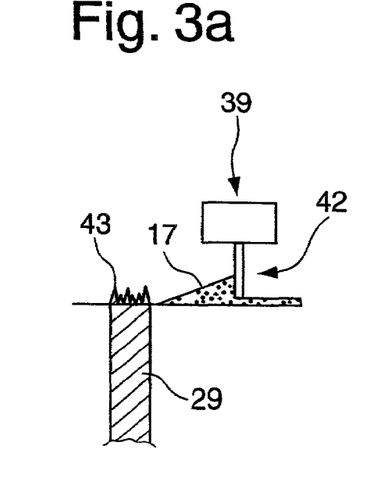
Figure 3B:
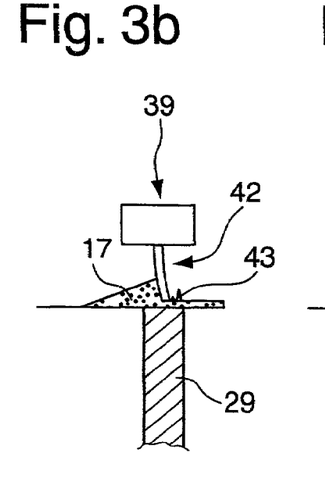
Figure 3C:
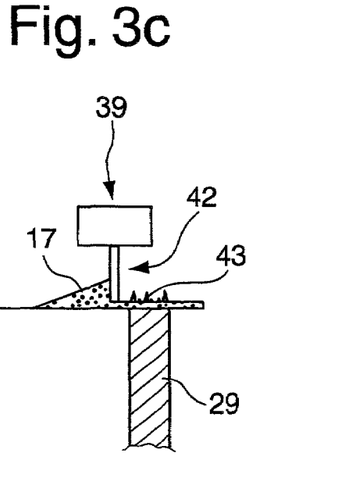

FIGS. 3a to c show a side view of the levelling device 39. The levelling device 39 comprises a multiplicity of individual elements 42 arranged in a row. In the embodiment illustrated in FIG. 3, the individual elements 42 are formed as bristles of a brush. These bristles are provided by thin metal wires or plates. Alternatively, it is also possible to use bristles made from plastic or the like. Furthermore, the bristles may also have a coating or a structure. The brush illustrated in FIG. 3 has a plurality of rows of individual elements 42, which are arranged one behind the other. The packing density is such that, in the event of a linear movement over the shaped body 29, a pulling effect is produced, so that a predetermined height of material powder 17 is set and levelled. The individual elements 42 of the levelling device 39 have free ends, which preferably lie in a common plane, so that the free ends form an imaginary continuous pulling-off edge.

After the material powder 17 has been melted, as what is now the bottom layer, the shaped body 29 has unevenness and projecting sections 43 which are higher than the desired layer thickness that is to be applied. These projecting sections 43 are formed during the melting and are also known as welding spatter. It is preferable to apply material layers of between 10 and 100 μm; the projecting sections may even amount to a multiple of the material layer.

The position of the levelling device 39 in FIG. 3a corresponds to the illustration shown in FIG. 2. An accumulation of metal powder 17, which emerges from the opening 37, has been built up in front of the individual elements 42 of the levelling device 39. During the passage over the shaped body 29, the material powder 17 drops onto the layer that was melted last. In addition, good filling of the valleys can be achieved as a result of the emergence of the material powder 17 from above. The levelling device 39 is guided over the surface of the shaped body 29 at the preset thickness of the material-layer thickness which is to be applied, the individual element(s) 42 being shifted, deflected or diverted with respect to the level of the projecting sections 43 projecting above the material layer. This makes it possible for, for example, one, two or more individual elements 42 to leave their current position as a result of the projecting section 43, while the other individual elements 42 allow uniform distribution and levelling of the material powder 17. As a result, as illustrated in FIG. 3b, the space or valleys between the projecting sections are uniformly filled with material powder. The individual elements 42 of the levelling device 39 lead, as it were, to a combing action through the uneven and rough surface. After the shaped body 29 has been passed over, all the individual elements 42 of the levelling device 39 are once again in their normal position and guide the excess material powder into the collection vessel 23.

The shaped body 29 is passed over at least one more time, from the other direction. As a result, the projecting sections 33 can be completely filled with material powder 17 from at least two directions of movement. The material powder 17 at a constant level is provided all the way around the projecting sections 43. As a result, during the subsequent melting of the material powder 17 by the laser beam 27, the projecting section 43 can be integrated into the newly melted layer and, if appropriate, can merge completely into the newly melted layer by being fused to it.

This procedure allows in particular even delicate structures to be built up, since the levelling of the material layer with the levelling device according to the invention takes place with scarcely any force being applied by individual elements 42.

It is also possible for the levelling device to pass over the shaped body from a plurality of different directions or directions which deviate from one another. It is also possible for one or two levelling devices 39 to be coupled to the applicator unit 34 and, separately, for further levelling devices 39 to be provided, which pass over the shaped body 29 from different directions.

Furthermore, as an alternative it is possible for the levelling device 39 to pass over the shaped body 29 not in a rectilinear movement but in a circular or elliptical movement. A combination of the movement forms is also possible. In addition, it is possible for the levelling device 39 itself, in addition to the linear movement component as it passes over the shaped body, to have a further movement component. In addition to an oscillating movement, such as a vibratory movement, this may also be a rotary movement. By way of example, a linear movement over the shaped body may have a rotating levelling device, in particular with brushes, superimposed on it.

The levelling device designed as a brush, which is described in FIGS. 3a to c, has the advantage that, on account of the deflection of one or more bristles, springing back of the bristles is decelerated and suppressed immediately by the bristles which lie in the immediate vicinity, with the result that there are no problems during the further application.

Figure 4A:
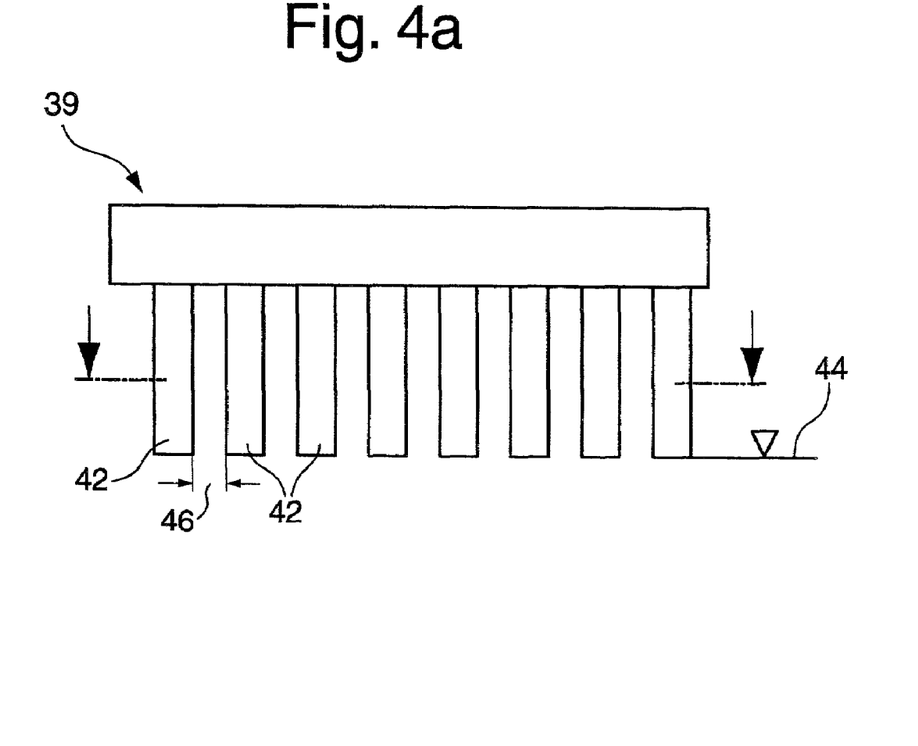
Figure 4B:
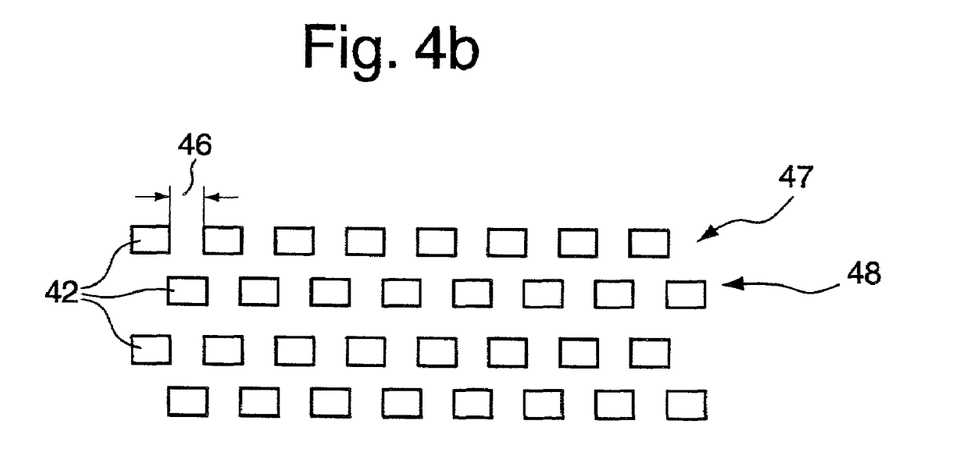

FIGS. 4a and b show an alternative embodiment of a levelling device 39. The individual elements 42 are designed in the form of small plates or strips and are arranged at a distance 46 from one another. In a similar manner to a first row 47, a second row 48 of the individual elements 42 is provided, but these elements are staggered with respect to the first row 47. Depending on the particular application, both the first row 47 and the second row 48 may be repeated a number of times.

As an alternative, it is also possible for the first, second and any further rows to be arranged not in staggered form, but rather partially overlapping the individual elements 42 of the previous row. The distance between the two or more rows can also be varied. The individual elements 42 are advantageously produced from very thin sheet-metal layers. It is also possible to provide round bristles or other geometries for individual elements 42. In this embodiment too, as in the embodiment described in FIG. 3, there is provision for the free ends of the individual elements 42 to lie in one plane 44.

The length and thickness of the individual elements 42 is designed, taking account of the material and its spring rate, in such a manner that preferably, after deflection of an individual element 42 by a projecting section 43, the subsequent vibration approximates to aperiodic damping. This is the object of all embodiments according to the invention.

Figure 5A:
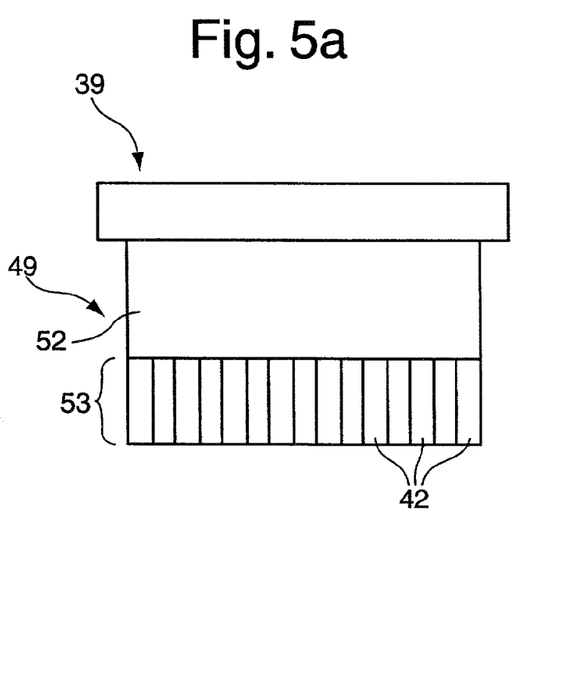
Figure 5B:
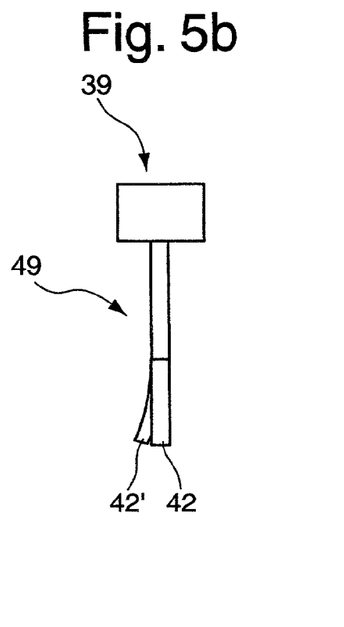

FIGS. 5a and b show a front view and a side view of an alternative embodiment of a levelling device 39. This embodiment is designed as a lip 49 that has a first area 51, which is of continuous design, and a second area 52, which comprises individual elements 42. The individual elements 42 are deflected over the free length of the individual elements 42. FIG. 5b illustrates, by way of example, one deflected individual segment 42'. The alternative embodiments of the individual elements 42 which are described in FIG. 3 and FIG. 4 can also be applied to the embodiment shown in FIGS. 5a and b.

Figure 6:
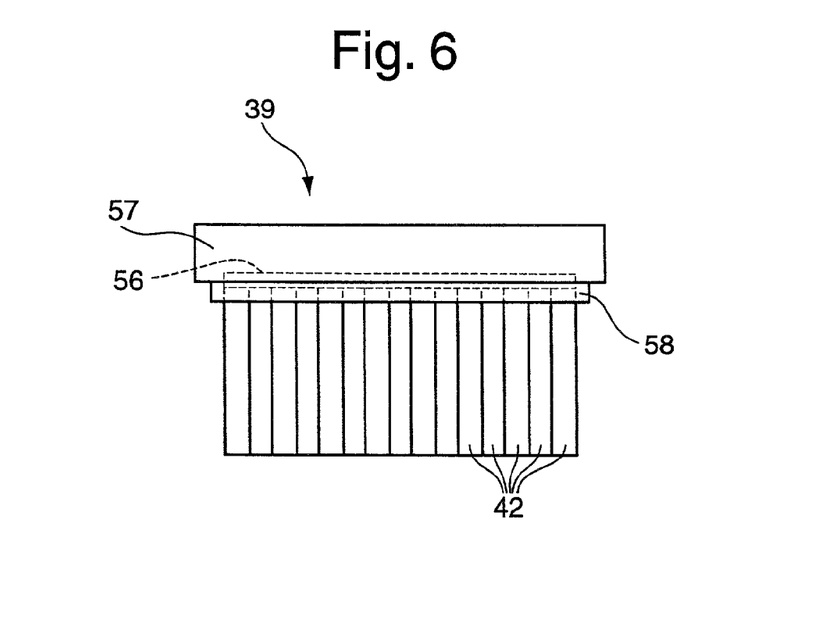
FIG. 6 shows a diagrammatic side view of a further alternative configuration of the levelling device.

A further alternative embodiment of the levelling device 39 is described with reference to FIG. 6. The individual elements 42 are provided via an articulated connection 56 to the receiving part 57. Advantageously, a damping element 58 is provided close to the articulation 56, on one or both sides of the individual elements 42. The articulated receiving part enables the individual elements 42 to be deflected more easily. After the deflection, the vibration is rapidly stabilized by means of the damping element(s) 58, so that uniform and constant levelling of the layer thickness is produced.

In terms of positioning, the embodiments of the levelling device 39 which are described in FIGS. 3 to 6 may differ from the right-angled orientation with respect to the surface of the material-powder layer. For example, it is possible, depending on the direction of movement, to set an angle of inclination of the individual elements 42, so that the individual elements 42 trail the direction of movement of the applicator unit 34. In addition, the levelling devices 39 may be provided via a vibration-generating device on the applicator unit 34, so that the levelling device 39 executes an oscillating movement, for example transversely to the linear movement, during the application of the material powder 17.

Furthermore, it is provided that, when, for example, relatively wide individual elements 42 are used, the free end may have either a rectangular termination, a V-shaped, bevelled termination or the like. Furthermore, the individual elements 42 may be formed not only from metallic material, but also from other materials, such as plastics or the like. The individual elements may advantageously have a coating with a self-cleaning effect.

Figure 7:
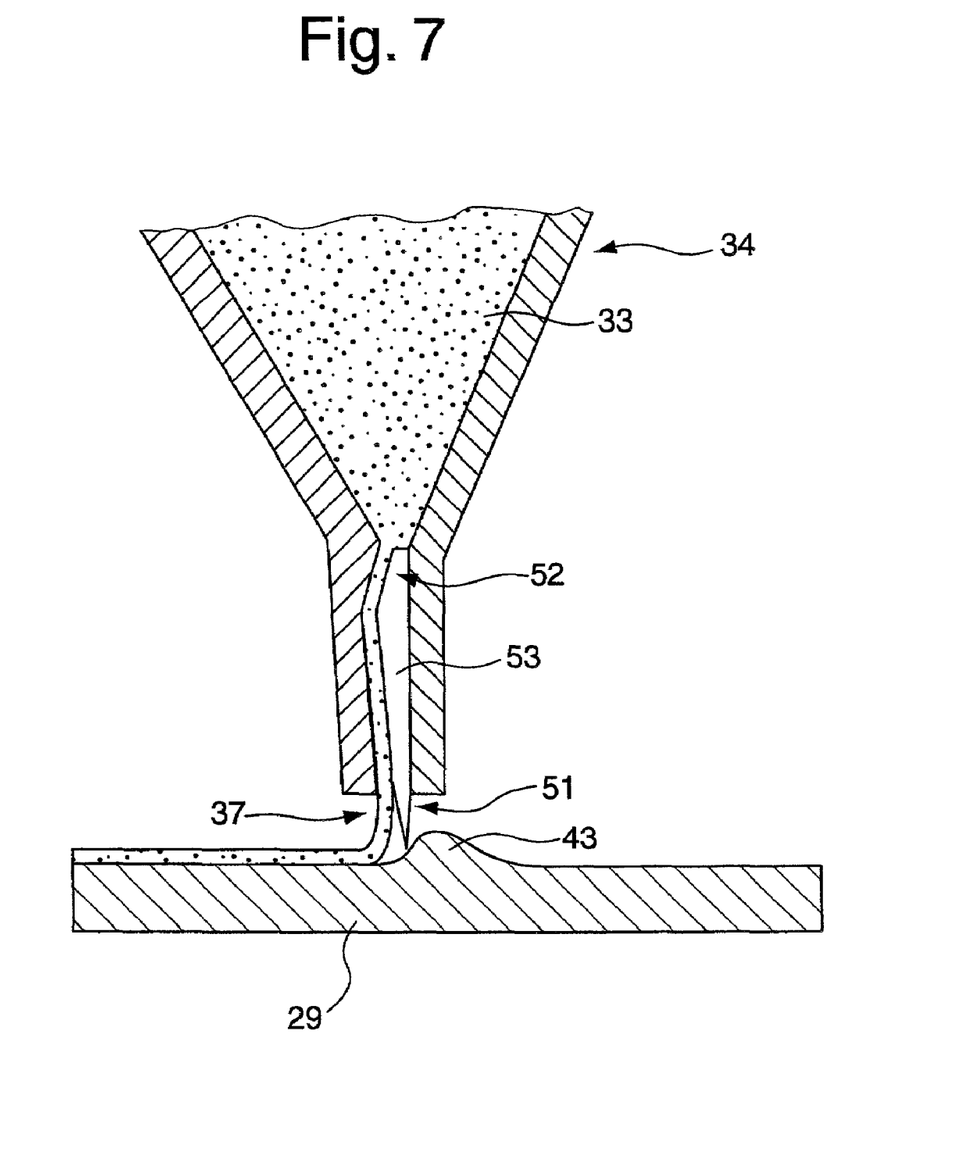
FIG. 7 shows a diagrammatic side view of an alternative applicator unit for applying the material-powder layer.

FIG. 7 shows an alternative embodiment for the selective application of material powder. The applicator unit 34 has a slot-shaped opening 37, in which a plurality of scanning elements 51, which are arranged next to one another, are arranged in such a manner that they can be deflected or displaced with respect to projecting sections 43 and unevenness. At an end that faces towards the shaped body 29, the scanning element 51 has a delicate scanning point, which can be used to record the projecting sections 43 exactly. A closure section 52, which closes the opening 37 at a defined level of the scanning element 51, is provided at an end of the scanning element 51 that faces towards the receiving vessel 33. The level of the applicator unit 34 is preferably set in such a manner that the scanning element 51 closes the opening 37 as soon as the desired layer thickness is exceeded at a projecting section 43. During further passage over the projecting section 43, it is possible for the scanning element 51 per se to yield resiliently, so that it can follow the path of the projecting section 43.

The scanning element 51 allows selective application of the material powder on the basis of direct mapping of the surface. The scanning element 51 has a central area 53 whose cross section remains constant irrespective of the position of the scanning element 51 in the opening 37. In this way, the maximum discharge of material powder can be limited. The scanning elements 51 that lie next to one another in a row along the opening 37 are provided in such a manner that they can move independently of one another in the opening 37.

As an alternative to the embodiment illustrated in FIG. 7, it is possible for a closure flap or a closure bolt to be actuated via a scanning element arranged on the applicator unit 34. The lever mechanism formed in this way is designed in such a manner that the scanned current states directly open the opening 37. Furthermore, it is possible, depending on the position of the scanning element, to partially open the opening for selective application of the material powder, by altering a magnetic field or by induction of a voltage. Furthermore, it is also possible for a scanning strip, which records the surface of the shaped body as the applicator unit passes over it and then directly actuates individual openings of the applicator unit by means of electrical signals, to be provided instead of the scanning needle.

The invention claimed is:

1. A process for producing a shaped body by selective laser melting, in which a shaped body is built up from pulverulent metallic material using CAD data of a model, comprising the following steps:

applying a powder layer using an applicator unit, fixing the applied powder layer to a layer below it using a focused laser beam, applying another powder layer selectively by the applicator unit to regions of a surface of the shaped body, which was melted last using the laser beam, having uneven or projecting sections which are larger than a predetermined layer thickness for a next powder layer that is to be processed and uncovering the uneven or projecting sections, which project above the desired layer thickness.

2. The process according to claim 1, further comprising the steps of:

recording areas that lie below or adjacent to a plane of the predetermined layer thickness for the next powder layer to be processed by means of a device, and applying the material powder in finely defined form in those areas.

3. The process according to claim 1, wherein the applicator unit is positioned above the surface of or passes over the shaped body one or more times.

4. The process according to claim 1, wherein the laser beam is guided over a predetermined area of the material-powder layer in a plurality of tracks, and the material powder applied is melted at the point of incidence of the laser beam, and the projecting sections lying in the predetermined areas are at least partly melted and integrated with the adjoining melted powder layer.

5. The process according to claim 1, wherein the levelling device passes over the shaped body at least twice, in order to level the material powder to be applied.

6. The process according to claim 1, wherein the material powder which is applied to the shaped body by the applicator unit is immediately afterwards levelled to the desired height by the levelling device.

7. The process according to claim 6, wherein the applicator unit is coupled to the levelling device for the application and levelling.

8. A device for producing a shaped body by selective laser melting for carrying out the process according to claim 1, comprising a process chamber comprising a build-up chamber for the shaped body, an applicator unit that, after the shaped body has been positioned, applies a layer of powder a next desired layer thickness, when positioned above the shaped body or passed over the shaped body at least once, wherein the applicator unit comprises at least one leveling device having individual elements that pull off the powder layer down to the desired layer thickness and uncover the uneven or projecting sections of the layer below that project above the desired layer thickness.

9. The device according to claim 8, wherein the levelling device has at least one row of individual elements that can be deflected when passing over projecting sections.

10. The device according to claim 8, wherein the individual elements of the levelling device comprise free ends that lie in a common plane.

11. Device according to claim 8, wherein the levelling device is comprised as a brush.

12. The device according to claim 11, wherein the levelling device comprises a plurality of bristles that lie in a row and has at least two rows for bristles.

13. The device according to claim 12, wherein the bristles are of metallic form.

14. The device according to claim 11, wherein the levelling device has bristles which lie close together.

15. The device according to claims 8, wherein the individual elements of the levelling device comprise a lip with at least one row of small plates.

16. The device according to claim 15, wherein the individual elements are produced from a thin sheet-metal layer, by laser cutting.

17. The device according to claim 15, wherein the small plates are arranged adjacent to one another by fine cut lines.

18. The device according to claim 8, wherein the levelling device has individual elements that are arranged in such a manner that they are deflected by means of an articulated joint.

19. The device according to claim 18, wherein the individual elements comprise a damping element on at least one side close to the articulated joint.

20. The device according to claim 8, wherein the applicator unit comprise at least one scanning element with a closure section that interacts with an opening in the applicator unit and opens or closes the opening in the applicator unit as a function of a size of a projecting section.

21. The device according to claim 20, wherein the scanning element comprises a middle area which, irrespective of a position of the closure section in the opening, interacts with a further section of the opening and limits the maximum quantity of powder which can be discharged.

22. A device for producing a shaped body by selective laser melting for carrying out the process according to claim 1, comprising a process chamber comprising a build-up chamber for the shaped body, an applicator unit that, after the shaped body has been positioned, applies a layer of powder with a next desired layer thickness, when positioned above the shaped body or passed over the shaped body at least once, wherein the applicator unit comprises at least one scanning element with a closure section that interacts with an opening in the applicator unit and opens or closes the opening in the applicator unit as a function of a size of an uneven or projecting section.

* * * * *